(12) United States Patent
Huang et al.

(10) Patent No.: US 11,645,314 B2
(45) Date of Patent: May 9, 2023

(54) INTERACTIVE INFORMATION RETRIEVAL USING KNOWLEDGE GRAPHS

(71) Applicant: International Business Machines Corporation, Armonk, NY (US)

(72) Inventors: Liang-Shu Huang, New Taipei (TW); Kevin C. M. Lai, Taipei (TW); Chih-Hsiung Liu, Taipei (TW); Jarwow C. H. Wu, Taipei (TW); Wayen W. J. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 15/679,292

(22) Filed: Aug. 17, 2017

(65) Prior Publication Data

US 2019/0057145 A1 Feb. 21, 2019

(51) Int. Cl.
*G06F 16/33* (2019.01)
*G06F 16/332* (2019.01)
(Continued)

(52) U.S. Cl.
CPC ........ *G06F 16/3328* (2019.01); *G06F 16/248* (2019.01); *G06F 16/3329* (2019.01); *G06F 16/3344* (2019.01); *G06F 16/367* (2019.01); *G06F 16/9024* (2019.01); *G06N 3/08* (2013.01); *G06N 5/04* (2013.01); *G06N 20/00* (2019.01); *G06F 16/345* (2019.01)

(58) Field of Classification Search
CPC ............... G06F 16/3328; G06F 16/367; G06F 16/3359; G06F 16/951
See application file for complete search history.

(56) References Cited

U.S. PATENT DOCUMENTS 7,849,439 B2 * 12/2010 Green ...................... G06F 8/30
717/105
9,268,820 B2 2/2016 Henry
(Continued)

FOREIGN PATENT DOCUMENTS

CN 104102713 A 10/2014
WO 2016008261 A1 1/2016

OTHER PUBLICATIONS

IP search.*
(Continued)

*Primary Examiner* — Loc Tran
(74) *Attorney, Agent, or Firm* — Donald J. O'Brien

(57) ABSTRACT

A method includes receiving a natural language query at an information system, the natural language query indicating an intent and at least a first factor and a second factor. The method also includes retrieving a set of candidate information from the information system based on the natural language query, the set of candidate information having a type determined by the intent. The method additionally includes selecting a knowledge display template from a set of knowledge display templates using the intent, the first factor and the second factor. The method further includes rendering, using the knowledge display template, a first knowledge graph comprising the set of candidate information, the first knowledge graph indicating a relationship between the set of candidate information based the first factor and the second factor.

15 Claims, 7 Drawing Sheets

(51) Int. Cl.
*G06N 3/08* (2023.01)
*G06N 5/04* (2023.01)
*G06N 20/00* (2019.01)
*G06F 16/248* (2019.01)
*G06F 16/901* (2019.01)
*G06F 16/36* (2019.01)
*G06F 16/34* (2019.01)

(56) References Cited

U.S. PATENT DOCUMENTS

| | | | |
|---|---|---|---|
| 2009/0192968 A1* | 7/2009 | Tunstall-Pedoe | G06N 5/022 |
| | | | 706/53 |
| 2011/0307435 A1* | 12/2011 | Overell | G06F 16/367 |
| | | | 706/46 |
| 2012/0158633 A1 | 6/2012 | Eder | |
| 2013/0262449 A1 | 10/2013 | Arroyo et al. | |
| 2014/0122107 A1* | 5/2014 | Malven | G16H 10/40 |
| | | | 705/2 |
| 2014/0280307 A1 | 9/2014 | Gupta et al. | |
| 2015/0095303 A1 | 4/2015 | Sonmez et al. | |
| 2015/0095319 A1 | 4/2015 | Ormont et al. | |
| 2015/0269176 A1* | 9/2015 | Marantz | G06F 16/90324 |
| | | | 707/767 |
| 2015/0286709 A1 | 10/2015 | Sathish et al. | |
| 2016/0063106 A1* | 3/2016 | Chai | G06F 16/9024 |
| | | | 707/E17.014 |
| 2017/0177715 A1* | 6/2017 | Chang | G06N 5/04 |

OTHER PUBLICATIONS

Demartini, "A Tutorial on Leveraging Knowledge Graphs for Web Search," Springer, vol. 573 of the series Communications in Computer and Information Science, Jul. 26, 2016, pp. 24-37.

Edward, "How to enhance your Google Knowledge Graph result (case study)," Search Engine Land, printed Mar. 10, 2017, 5 pages.

Paulheim, "Knowledge graph refinement: A survey of approaches and evaluation methods," Semantic Web, vol. 8, No. 3, 2017, pp. 489-508, DOI: 10.3233/SW-160218.

Unknown, "CELIA: The Next Generation of Watson," YouTube, Published Jan. 19, 2016, printed Aug. 8, 2017, 3 pages, https://www.youtube.com/watch?v=bMXPyKYY0u8.

* cited by examiner

INTERACTIVE INFORMATION RETRIEVAL USING KNOWLEDGE GRAPHS

BACKGROUND

The present disclosure relates to information systems, and more specifically, to retrieving information from an information system using knowledge graphs and incremental reasoning.

Information systems enable the structured storage and retrieval of large volumes of information. These systems accept user or client provided queries to retrieve specific pieces of information from one or more information source associated with the information systems. A query can be structured (e.g., written in a specific format natively interpretable by the information system) or unstructured (e.g., composed in a natural language format more amenable to communication between human beings). Software or hardware components of information systems can analyze queries to extract logical and semantic elements (e.g., predicates and conditionals) for locating or specifically identifying information stored in the information system. The information systems may provide information located or identified by the extracted logical elements to in response to the user or client provided queries.

SUMMARY

According to embodiments of the present disclosure, a method can include receiving a natural language query at an information system, the natural language query indicating an intent and at least a first factor and a second factor. The method can also include retrieving a set of candidate information from the information system based on the natural language query, the set of candidate information having a type determined by the intent. The method can additionally include selecting a knowledge display template from a set of knowledge display templates using the intent, the first factor and the second factor. The method can further include rendering, using the knowledge display template, a first knowledge graph comprising the set of candidate information, the first knowledge graph indicating a relationship between the set of candidate information based the first factor and the second factor.

Other embodiments are directed to systems and computer program products for implementing the method described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
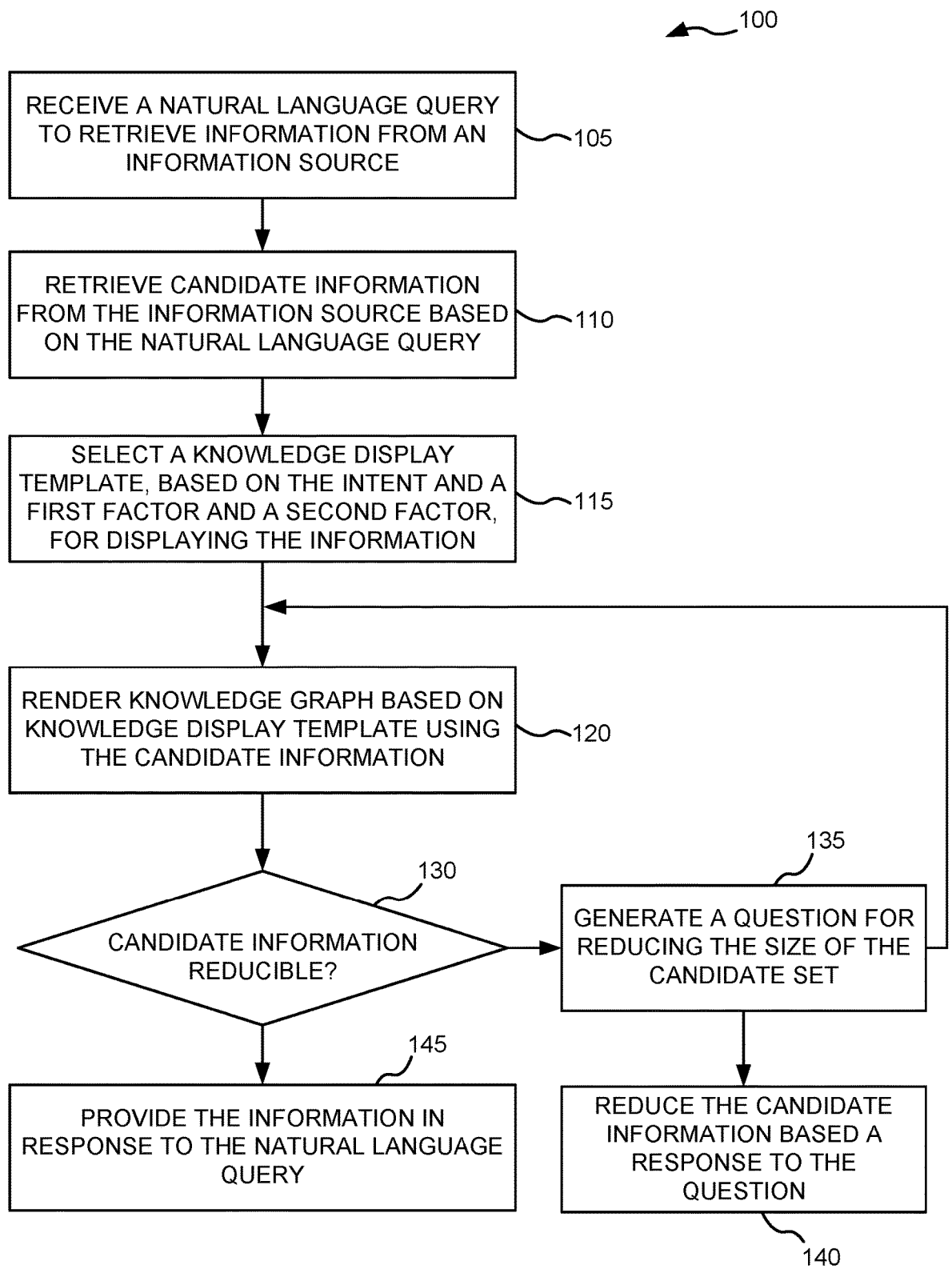
FIG. 1 depicts a flowchart of a set of computer implemented operations for retrieving information from an information system using knowledge graphs and incremental reasoning, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to information systems, more particular aspects relate to retrieving information from an information system using knowledge graphs and incremental reasoning. While the present disclosure is not necessarily limited to such applications, various aspects of the disclosure may be appreciated through a discussion of various examples using this context.

Information systems rely on users to provide queries having sufficient logical and semantic elements to enable the systems to identify or locate requested information. An information system can transform a query into a structured search criteria for searching stored content accessible to the information system. The stored content may include information sources such as filesystems, databases, storage arrays and distributed storage systems. Information in the stored content satisfying the query can be returned to user in a result set (e.g., a set of one or more data items or objects matching the query) in specified format. Matching information, for example, can be returned as files, data streams, or as rendered objects (e.g., a graph).

In certain circumstances, a received query may not provide enough logical or semantic elements to enable an information system to locate a requested piece of information from an information source. A user, for example, can issue a query to retrieve a specific file from a file system. The user, however, might not know the name of the specific file, but he might remember some auxiliary information about, for example, the circumstances under which the file was created. The auxiliary information can include, for example, the file creation date, a physical location where the file was created or last accessed (e.g., a specific meeting room or office), the names of individuals present at the physical location, and the topics or subject matter discussed at the physical location or otherwise associated with the file. This auxiliary information can be recorded and stored as metadata associated with the file when the file is created, stored, or accessed. A query including some of this auxiliary information may match several files, preventing the information system from accurately responding to the request. In some case, the query may not match any data items stored on the information system. Under these circumstances, the storage system can return a result set having data items that most closely match or satisfy the query. Alternatively, the information system can require the user to augment the query with additional information to narrow or otherwise refine the scope of the request. The information system can execute a new search based on the augmented query to try to satisfy the users' request.

A user can augment a query by analyzing relationships amongst a result set provided by an information system and using these relationships to refine (e.g., reform) the query. A knowledge graph can be used to display complicated relationships among elements of a result set. A knowledge graph is a structure (e.g., a graph having nodes connected by edges) that describes entities (e.g., data objects or elements of a result set) and their interrelations. A knowledge graph provides a way for graphically (or mathematically) representing relationships between arbitrary entities based on known or derived information. As new information is acquired, the ontology of a knowledge graph can be adjusted or changed incorporate the new data. Knowledge graphs generated from an information rich result set (e.g., a result set where elements have complicated relationships) can be complicated and difficult for a user to analyze.

Embodiments of the present disclosure are based on the recognition that a query used to produce a result set can be used to generate custom knowledge graphs that fit a user's intention and models the implicit relationship among elements of the result set and important factors or concepts (hereinafter, "a set of factors") extracted from the query. These custom knowledge graphs may be simpler and easier to analyze than other predefined knowledge graphs. Additionally, the ontology of these custom knowledge graphs, selected to fit the intent of a user and the relationships between a set of factors in the query and the elements of a result set generated from the query, enables information systems to algorithmically generate questions that can reduce or otherwise refine the scope of a query (e.g., reduce the size of the result set generated in response to executing the query) to provide more accurate results to users. Further, information systems can use the questions to incrementally learn and adapt to user preferences (e.g., the information system can, for example, learn the best way present a result set to a user).

As used herein, machine learning techniques include methods and systems used to computationally construct algorithms and generate models that can learn and make predictions on data. A core objective of machine learning techniques is to enable a machine to generalize, or make accurate predictions, from past experiences. The learning varies by the particular machine learning algorithm or technique used, but a common thread of the techniques is to ingest or analyze a large corpus of data (e.g., images, sentences, phrases, books, and other text or data) and build models or adapt algorithms to enable a machine to make statistically reliable or accurate predictions on new data. Some example machine learning techniques that can be used to implement the embodiments of the present disclosure include: decision tree learning, association rule learning, artificial neural networks, deep learning, inductive logic programming, support vector machines, clustering, Bayesian networks, reinforcement learning, representation learning, similarity and metric learning, and learning classifier systems. Other machine learning techniques and algorithms can also be used to implement the embodiments of the present disclosure.

Figure 7:
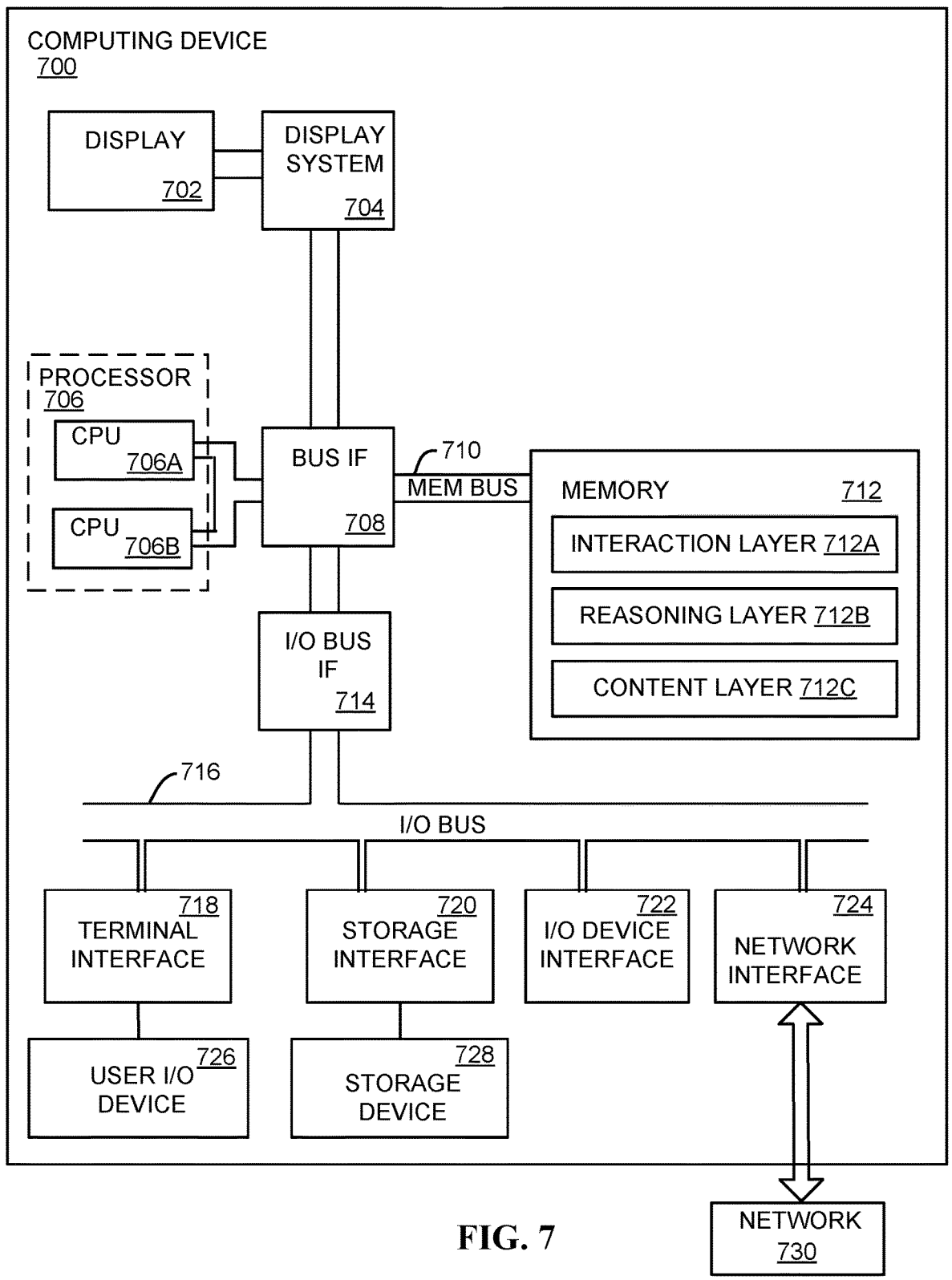
FIG. 7 depicts a block diagram of a computing system for implementing a set of operations for retrieving information from an information system using knowledge graphs and incremental reasoning, according to various embodiments.

Turning now to the figures, FIG. 1 depicts a flowchart 100 of a set of computer implemented operations for retrieving information from an information system using knowledge graphs and incremental reasoning, according to various embodiments. The operations depicted in flowchart 100 may be implemented on, or executed by, one or more computing nodes, such as the computing device 700 (FIG. 7). At least one of the one or more computing nodes can include software and hardware components (e.g., the hardware and software components associated with the system 205 shown in FIG. 2), including information sources, for implementing specific operations described herein. The one or more computing nodes and associated hardware and software components are collectively referred to as an information system. The information retrieved from the information system may be referred to as a result set and may include one or more data items or data objects.

At operations 105, the information system can receive a natural language query from a user to retrieve a data item (e.g., a specific piece of information, file, data structure, data stream, or other data or filesystem object) from an information source. The information system can receive the natural language query through a verbal input device (e.g., a microphone associated with the information system can receive a verbal request from a user to "please retrieve and display a file that I discussed with Bob last week"). The information system can also receive the natural language query through an interactive graphical user interface, a text input source, or any other method or device for interfacing with a user. Some examples of other interfacing methods include an interactive robot, a mobile device application, or a webpage.

The information system can analyze the natural language query to determine an intent of the query and a set of factors that capture important concepts in the query. The intent of a query can indicate the purpose or objective of a user issuing the query. Further, intent can indicate what a user wants to accomplish, or a type of object or response a user expects to receive from an information system, in response to issuing a query. For example, the intent of the query "please retrieve and display a file I discussed with Bob last week" is to retrieve and display a file. Similarly, the intent of the query "what is the current time?" is determine a time.

The set of factors capturing the important concepts in a query can be the most critical factors, topics or concepts to enable an information system to accurately respond to the query. For example, a natural language query can be stated as, "show me the file I discussed with Jim last week". An information system receiving this query can determine that a user is trying to retrieve a file (e.g., the intent of the query is "file search") based on the user's memory of "time" and "people". Since these time and people appear to be important concepts in the query, the information system can determine that the set of factors (e.g., important or critical factors) to be extracted from this query are "time" and "people". Similarly, the query "show me the files that are related to Block Chain that were discussed in Room D" can have "topic" and "location" as the set of factors. These factors can change based on the analysis, and based on the intent, of the query. The set of factors in a query can be determined using known natural language processing techniques. Natural language processing use machine learning to automatically learn rules to analyze natural language to extract the concepts, structure and other details to derive meaning, or to understand, what is written or spoken. The machine learning techniques can include executing algorithms to ingest or analyze a sets of examples natural language texts (e.g., books, journals, sentences, or other corpus) and making statistical inferences about the concepts, structures and overall meaning of the text.

Several factors can be extracted from a given natural language query. In some embodiments, the custom knowledge graphs described herein can be generated using a set of two factors extracted from a natural language query. In these embodiments, when more than two factors are included in a natural language query, the query can be further analyzed (e.g., by using natural language processing or through further interactions with a user) to determine the two most important factors, as described herein. In some embodiments, the set of two factors can be named entities in the custom knowledge graph.

At operation 110, the information system can execute a natural language query to receive a result set (e.g., a set of candidate information) matching or satisfying the natural language query. The type of data items or data objects included in the result set are determined, at least in part, by the intent of the query. For example, when the intent of the query is to file search, the information system can return a result set having a set of files matching the query within, for examples, a degree of accuracy enabled by the elements of the query. In some embodiments, when no data items exactly match or satisfy the query, the information system can return a result set of data items that most closely match or satisfy the query.

At operation 115, the information system can select a knowledge display template from a set of knowledge display templates for rendering a result set. A knowledge display template can be a data structure that indicates the display format or structure for a custom knowledge graph (hereinafter, "knowledge graph") based on a determined intent and set of factors for a query. Each knowledge display template in the set of knowledge display templates can cause the display or rendering of a different type of knowledge graph using on a given result set. A first knowledge display template, for example, based on a query having a determined intent of "file search" and having a "place" and "person" as important factors can be used to generate a knowledge graph having people (e.g., names, images of people, or other avatar representing a person) and specific locations (e.g., a conference room where a was created) as nodes. Files matching the query can be displayed in association with the nodes. A second knowledge display template based a query having a determined intent of "file search" and having "person" and "time" as the set of factors can be used to generate a knowledge graph having individuals as nodes. Files can be associated with each node based on, for example, a time scale.

In some embodiments, selecting the knowledge display template can include training a classification model (e.g., a knowledge template classifier) using a set of training sentences. Each sentence can, for example, indicate a different way of querying the information system for particular data item. In certain embodiments, each sentence can also include, or be annotated with, data or metadata indicating the intent and set of factors associated with a query corresponding to the sentence. In other embodiments, each sentence can include, or be annotated with, data or metadata indicating a particular knowledge graph or knowledge display template that should be used (e.g., based on the user's preference) to render a result set generated for a query corresponding to the sentence. The information system can use training sentences and associated data or metadata to generate classification model using machine learning techniques. The classification model can then be used to select a knowledge display template for rendering a result set for a new natural language query.

At operation 120, the information system can render a knowledge graph using the selected knowledge display template. A knowledge graph rendered according to the techniques described in this disclosure is customized to the intent and the set of most important factors or concepts in a query, as described herein. The knowledge graph, for example, can be rendered, based on a knowledge display template, to show or indicate a relationship between elements of a result set of a query and the two most important factors extracted from the query.

At operation 130, the information system can determine whether the result set retrieved in operation 110 is reducible. A result set may be reducible when, for example, the result set includes more elements than the number of elements required to accurately respond to, or satisfy, a query. When a result set is reducible, the information system may not have sufficient information (e.g., specified in the query or in the metadata associated with the elements of the result set) to accurately respond to the query. The information system, for example, may not have enough information to select the specific element desired by a user from the result set. The information system can continue to operation 145 when the result set is not reducible, while the information system can proceed to operation 135 when the result set is reducible.

At operation 145, the information system can provide the result set to, for example, a user in response to the natural language query. Providing the result set to a user can include rendering the result set in a knowledge graph, as described for operation 120. Providing the result set to a user can also include transferring the result set to an area of memory accessible to the user. Other methods of providing the result set are possible.

At operation 135, the information system can generate a set of questions for reducing the number of element in, or the size of, the result set. Based on the knowledge display template selected in operation 115, the information system can generate a set of questions for reducing the result set based on analysis of the relationships between elements of the result set, the intent of the natural language query received in operation 105, and the set of factors extracted from the query. The questions can be generated by a knowledge template classifier component of the information system. The knowledge template classifier will be discussed in more detail during the discussion of FIG. 2.

The information system can transmit or communicate the set of questions generated in operation 135 to the user. Based on the user's response to the questions, the information system can reduce the result set, as shown in operation 140. The result set can be reduced when, for example, a response to the set of questions reveals information that excludes one or more elements from the result set from being possible candidates responses to the query received operation 105. The result set can also be reduced when a response to the set of questions provides information that makes one or more elements of the results a more likely candidate response to the query received in operation 105. The information system can then return operation 120.

Figure 2:
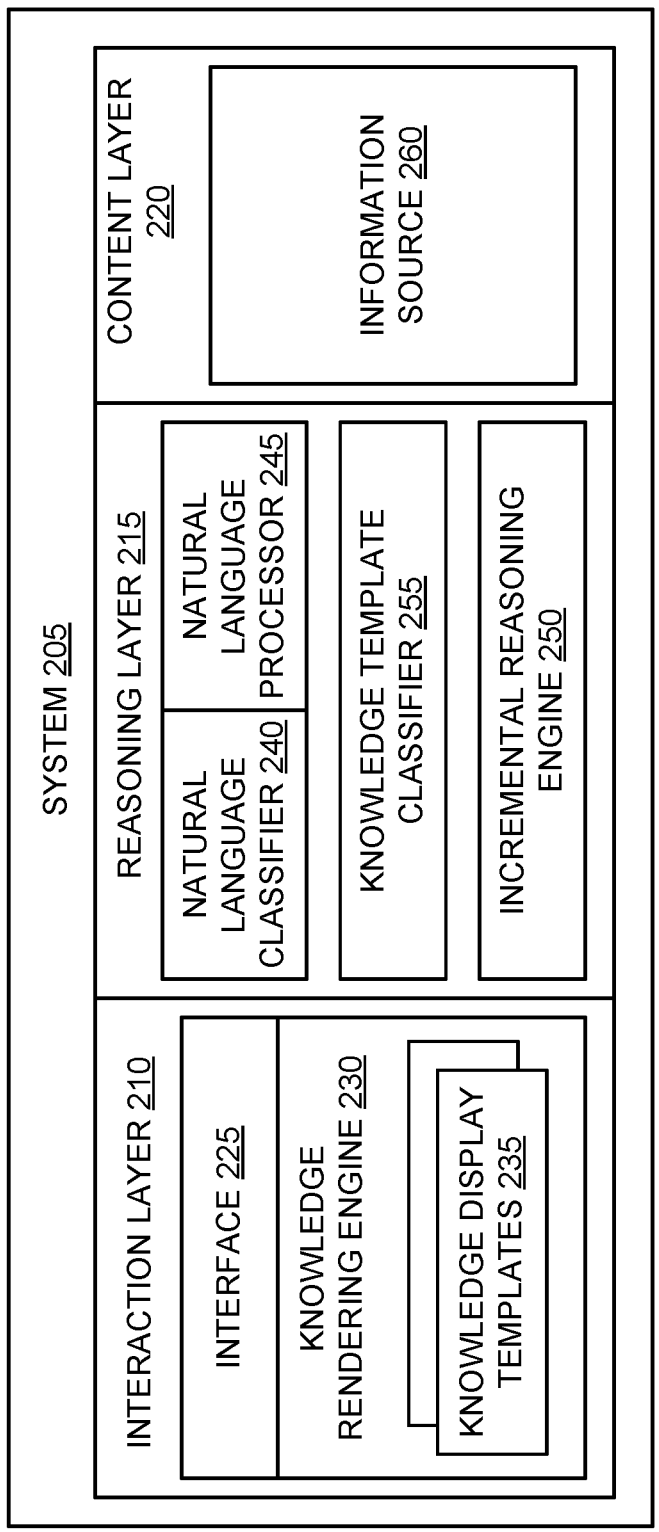
FIG. 2 depicts a block diagram of an example system for retrieving information from an information system using knowledge graphs and incremental reasoning, according to various embodiments.

FIG. 2 depicts a block diagram of an example system 205 for retrieving information from an information system using knowledge graphs and incremental reasoning, according to various embodiments. The system 205 may be a computing device (or computing node) such as the computing device 700 (FIG. 7). The system 205 can be an information system, as described herein. The components of the system 205 can a combination of software and hardware components configured to implement and execute the operations described herein. The system 205 includes interaction layer 210, reasoning layer 215, and content layer 220. Each layer and component of the system 205 can communicate with, or be coupled to, one or more other layer or component via hardware (e.g., a communication bus, network adapter, or physical memory) or software (e.g., a software sockets and application interfaces) communication channels, as described herein.

The interaction layer 210 is a front end of the system 205 configured to enable interaction with between a user and the system. The interaction layer can be, for example, a robot, an application executing on mobile device, or a webpage. In some embodiments, the interface layer can include an interface component 225 and a knowledge rendering engine 230.

The interface 225 can include software and hardware components for receiving input (e.g., a natural language query) from, and providing output (e.g., a result set generated in response to a query) to, a user. The hardware components can include, for example, a keyboard, a microphone, and textual or graphical display device. The software components can include, for example, a graphical user interface or other software based methods of interfacing with between a user and a computing system.

The knowledge rendering engine 230 includes hardware and software components for rendering a result set generated in response to a natural language query. The knowledge rendering engine can render a result set based on a user's intention and based on relationships between elements of the result set and a set of factors extracted from the natural language query. A result set can be rendered in the form of a knowledge graph generated using a knowledge display template selected from a set of knowledge display templates 235. In some embodiments, the knowledge rendering engine can receive a knowledge display template, or a selection of a knowledge display template, from a knowledge template classifier 255.

The reasoning layer 215 can include natural language classifier 240, natural language processor 245, incremental reasoning engine 250, and knowledge template classifier 255. The natural language classifier (NLC) 240 can be a component of the reasoning layer configured to use machine learning to analyze a natural language query to determine an intent of the query. Similarly, the natural language processor is a component that uses machine learning to determine a set of factors from a natural language query. The reasoning layer 215 receives an intent of a natural language query from the NLC 240 and a set of factors from the NLP 245 and generates a structured query that can be sent to the content layer 220 to execute a search to match or generate a result set.

The knowledge template classifier 255 can be trained (e.g., using machine learning) to adapt to a user's preference for rendering knowledge graphs for natural language queries. The knowledge template classifier (KTC) 255 can receive an intent from a NLC 240, a set of factors from an NLP 245, and a set of relationships between elements of a result set for a natural language query. The KTC 255 can use the received intent, set of factors, and set of relationships identify or select a knowledge display template to transform a result set for a natural language query into a customized knowledge graph, as described herein. The intent and set of factors can be derived from a query is previously discussed. The relationships between elements of the result set can be extracted from metadata associated with each element of the result set when the element is created, stored or accessed in the content layer 220. For example, if an element of a result set is a file, metadata associated with the file can include the file creation date, team members or other people present when the file was created or accessed, location where the file was created or accessed, and topics discussed at the location. In some embodiments, a model for the KTC 255 can be trained using a corpus of example natural language queries and knowledge display templates. The KTC 255 can then use the trained model to select or return a knowledge display template, from the set of knowledge display templates 235, that can be used to transform a result set (e.g., in the form of a knowledge graph) into a customized display format (e.g., a custom knowledge graph).

The incremental reasoning engine 250 can be a separate component of the reasoning layer 215 or it can be a component of the KTC 255. The incremental reasoning engine 250 can be configured to receive a knowledge display template selected by the KTC 255 and determine a set of questions, based on the knowledge display template, for reducing a result set. The set of factor used to select a knowledge display template can be used to guide the selection or determination of the set of questions. For example, when a natural language query includes the two factors "user" and "location", the incremental reasoning component 250 can generate or select questions regarding users and locations to reduce the result set associated with the query. The system 205 can present the set of questions to, and retrieve responses from, a user via interaction layer 210. The responses can then be used to reduce a result set, as described herein.

In some embodiments, when a natural language query includes more than two factors, the incremental reasoning engine 250 (or the NLP 245) can generate a set of questions for identifying the two most important factors in the query. These two factors can be sued to selected a knowledge display template, as described herein.

The content layer 220 provides an interface to for receiving a structured query from, and to provide a result set to, the reasoning layer 215. A structured query can be a query written or composed in a machine interpretable query language (e.g., the Structured Query Language). In some embodiments, the content layer 220 includes information source 260. The information source 260 can include a collection of data or data objects from one or more data source. The information source 260, for example, can include databases, a filesystems, data streams, and other data sources. The content layer 220 can use or execute the structured query received from the reasoning layer 215 to search information source 260 for data objects matching the structured query. Matching data objects can be returned in a result set to the reasoning layer for rendering or presentation to a user.

Figure 3:
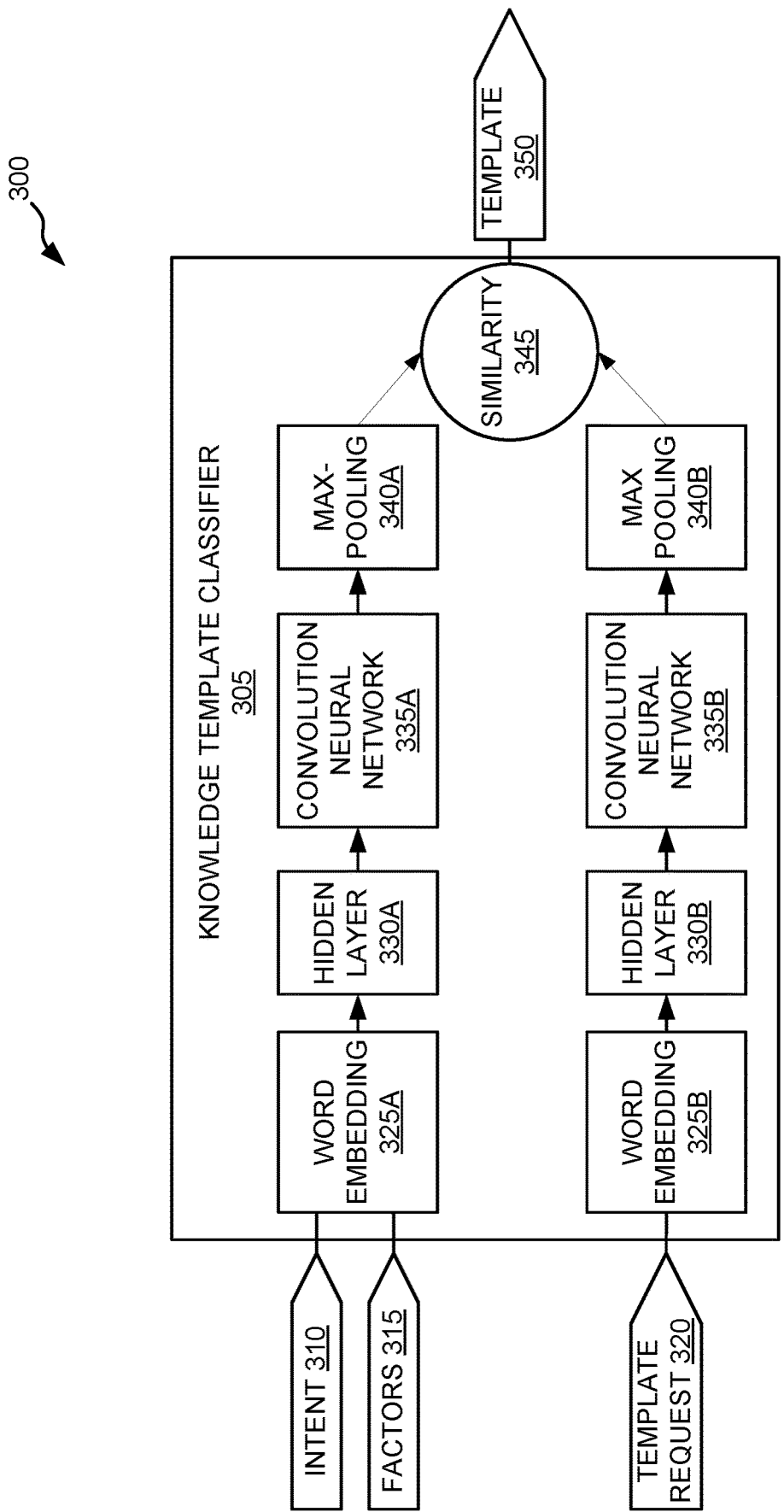
FIG. 3 depicts a block diagram of an example knowledge template classifier for selecting a knowledge display template based on a natural language query, according to various embodiments.

FIG. 3 depicts a block diagram 300 of an example knowledge template classifier 305 for selecting a knowledge display template based on a natural language query, according to various embodiments. The knowledge template classifier 305 can be substantially similar to the knowledge template classifier 255 (FIG. 2). The knowledge template classifier 305 can include word embedding component 325A and 325B, hidden layer 330A and 330B, convolutional neural network 335A and 335B, max pooling component 340A and 340B, and similarity component 345.

A model for the knowledge template classifier can be trained by providing a set of questions (e.g., queries or sentences, as indicated by template request 320) to the word embedding component 325B. Each question can be a potential formulation of a natural language query that a user can issue to an information system. The word embedding component 325B can transform the each question into a vector, where an element of the vector includes one or more words from the sentence. The hidden layer 330B can the receive the vectors from the word embedding component 325B and, using a neural network having one or more layers, derive weights for elements in the vectors. In some embodiments weights can be derived for the vectors themselves. The convolution neural network (CNN) 335B can receive the weighted vectors and execute one or more logical operations (e.g., filtering operations) to extract a set of features for each sentence and for the set of sentences. In some embodiments, the CNN 335B can extract or determine the most important sentence from the set of sentences or determine the most important words of a given sentence. The max pooling component 340B can traverse the set of features extracted by the CNN 335B and extract (e.g., by executing a down-sampling or other filtering operations) the most important features from the set of features. The max pooling component 340B can execute other operations to cause the most important features of the set of features extracted by the CNN 335B to stand out, or to be highlighted, compared to features of lesser importance. Sets of features produced by this layer can be associated with different knowledge display templates.

At run time, or while the system 305 is processing user provided natural language queries, the word embedding component 325A can receive a natural language query from, for example, interface layer 210. In some embodiments, the natural language query can be received from the NLC 240 and the NLP 245 as an intent 310 and a set of factors 315. The word embedding component 325A, hidden layer 330A, CNN 335A and max pooling component 340A are substantially similar to, respectively, the embedding component 325B, hidden layer 330B, CNN 335B and max pooling component 340B. The received natural language query can therefore be processed in substantially the same way the training sentences to produce a set of features at max pooling component 340A. The similarity component 345 can determine a similarity between the set of features produced by max pooling component 340A and the sets of features produced by max pooling component 340B. A knowledge display template 350 can be selected based on the determined similarity. In some embodiments, for example, the KTC 305 can select, as the knowledge display template 350, a knowledge display template associated with one of the sets of features produced by max pooling 340B that, for example, is most similar to the set of features produced by max pooling component 350A. Other selection criteria based on the determined similarity can be used.

Figure 4:
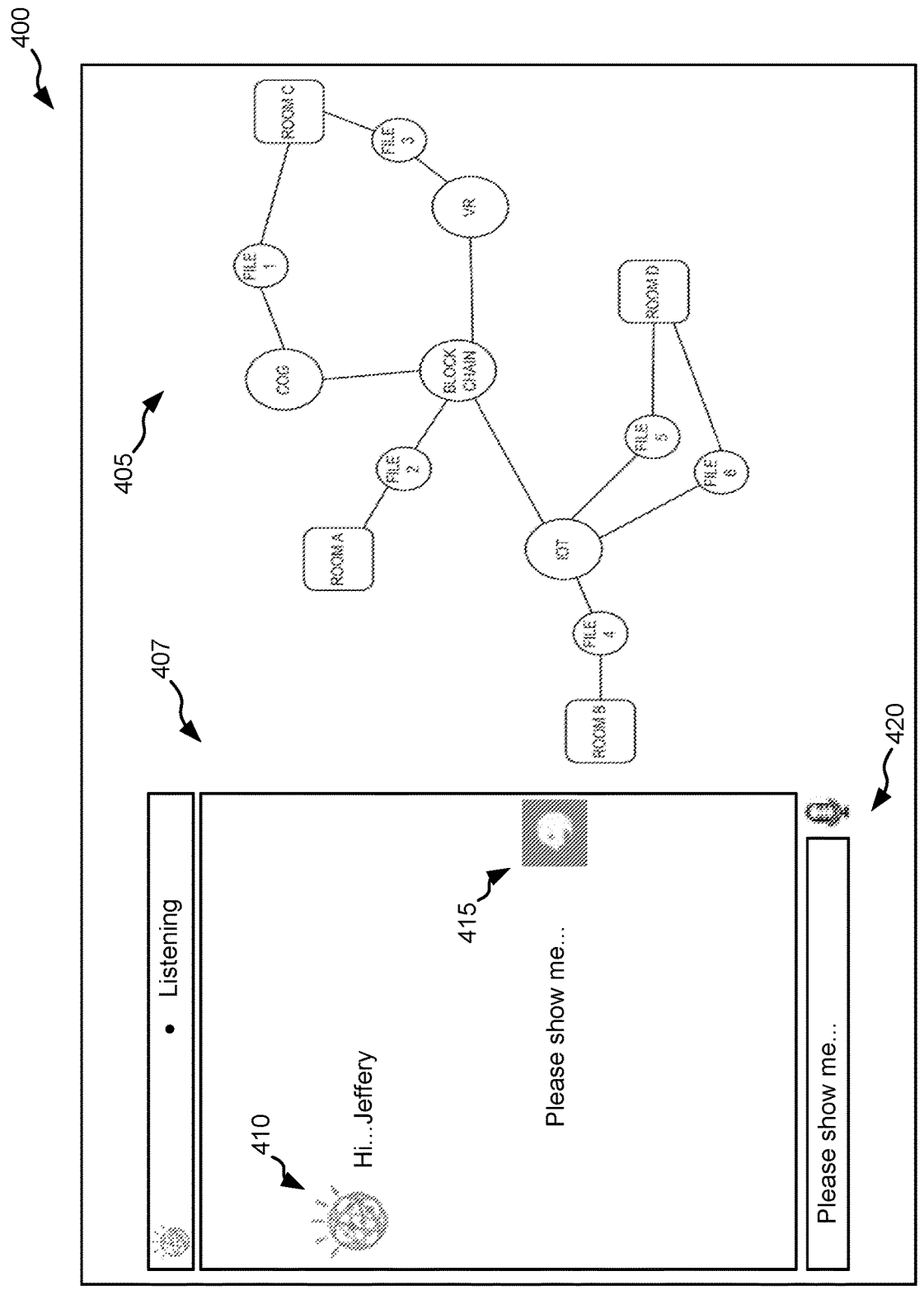
FIG. 4 depicts a block diagram of an example implementation of an interface to an information processing system, according to various embodiments.

FIG. 4 depicts a block diagram of an example implementation of an interface 400 to an information processing system, according to various embodiments. The interface 400 can be a graphical user interface coupled to one or more input-output device. The interface 400 can, for example, be rendered on a display screen, and can receive input from a text input device (e.g., a keyboard) or an audio input device (e.g., a microphone). The interface 400 can include a custom knowledge graph 405 rendering a display of a result set generated for a natural language query. In some embodiments, the interface 400 can include a dialog component 407 for interfacing between an information system 410 (e.g., an avatar of the information system) and a user 415. In certain embodiments, the interface 400 can further include form input component 420 to receive a natural language query, or responses to questions generated by the information system, from the user 415.

Figure 5:
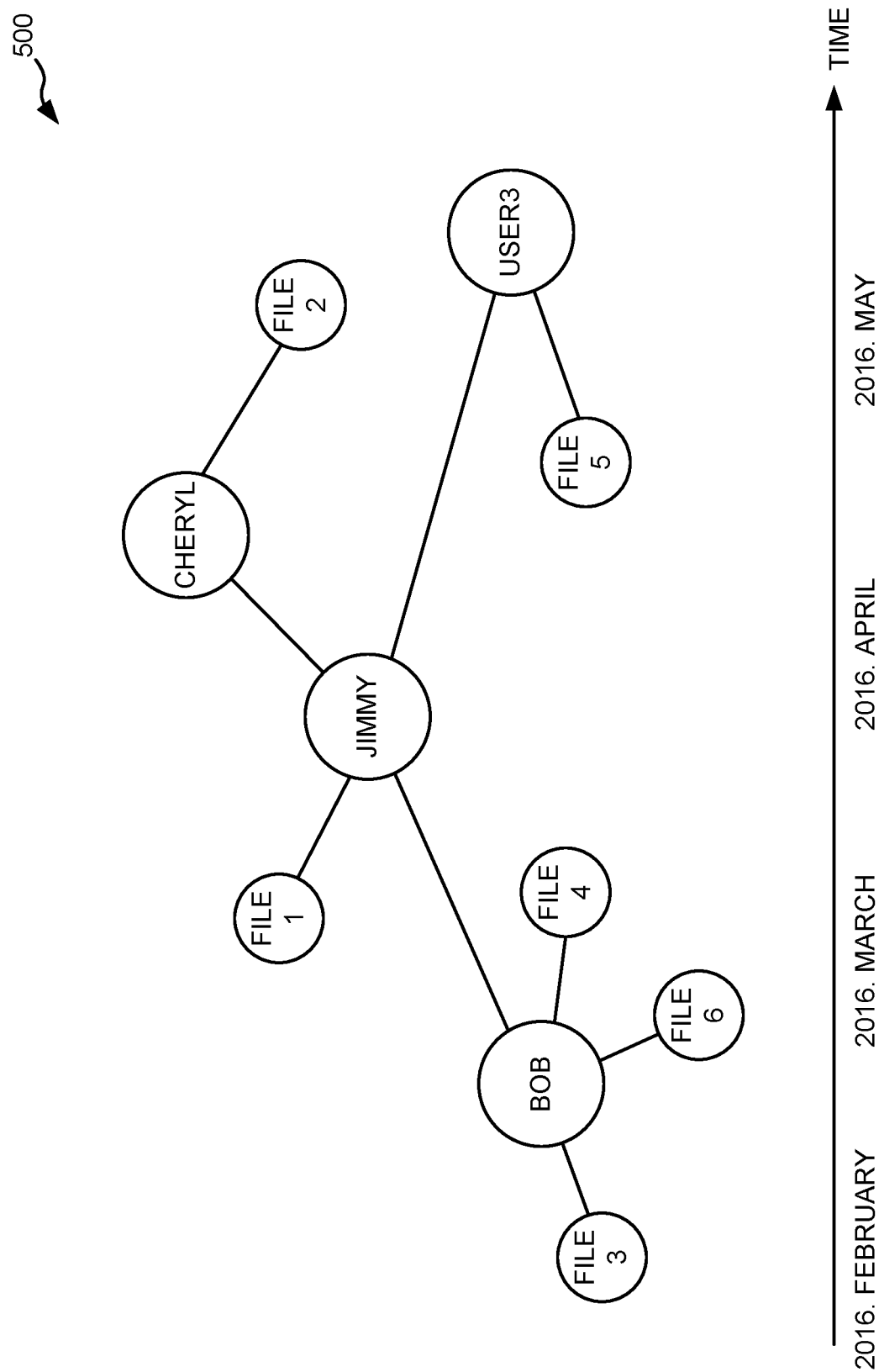
FIG. 5 depicts a block diagram of a knowledge graph generated according to a query intended to retrieve a file from an information system based on knowledge of time and a person associated with the file, according to various embodiments.

FIG. 5 depicts a block diagram of a knowledge graph 500 generated according to a query intended to retrieve a file from an information system based on knowledge of time and a person associated with the file, according to various embodiments. The knowledge graph 500 can be a custom knowledge graph generated from the natural language user query, "show me the file I discussed with Jimmy last week". Based on the natural language query, the information system can determine that the intention of the query is "file search". The information system can further determine that the set of factors included in the query are "user" and "time". A knowledge display template for generating a "USER-TIME" knowledge graph can be selected based on this intent and the set of two factors. The result set returned in response the natural language query includes file 1, file 2, file 3, file 4, file 5, and file 6. The information system can analyze metadata associated with each file in the result set to determine the relationships between the files, the time the files were accessed or created, and users present when the files were accessed or created. These relationships are displayed in the knowledge graph 500. The metadata associated with file 2, for example, can indicate that file 2 was discussed in March 2016 during, for example, a meeting where Jimmy and Cheryl was present. Since the natural language query matched several files and the user is expecting a single file, the natural language query does not have sufficient information to enable the information system to accurately respond to the user's request. The information system can analyze the relationships between files, users, and time in the knowledge display graph 500 to determine that the result set can be reduced by asking the user, "did Cheryl join your discussion as well?" An affirmation response to this question reduces the result set to file 2, which can be provided the user.

Figure 6:
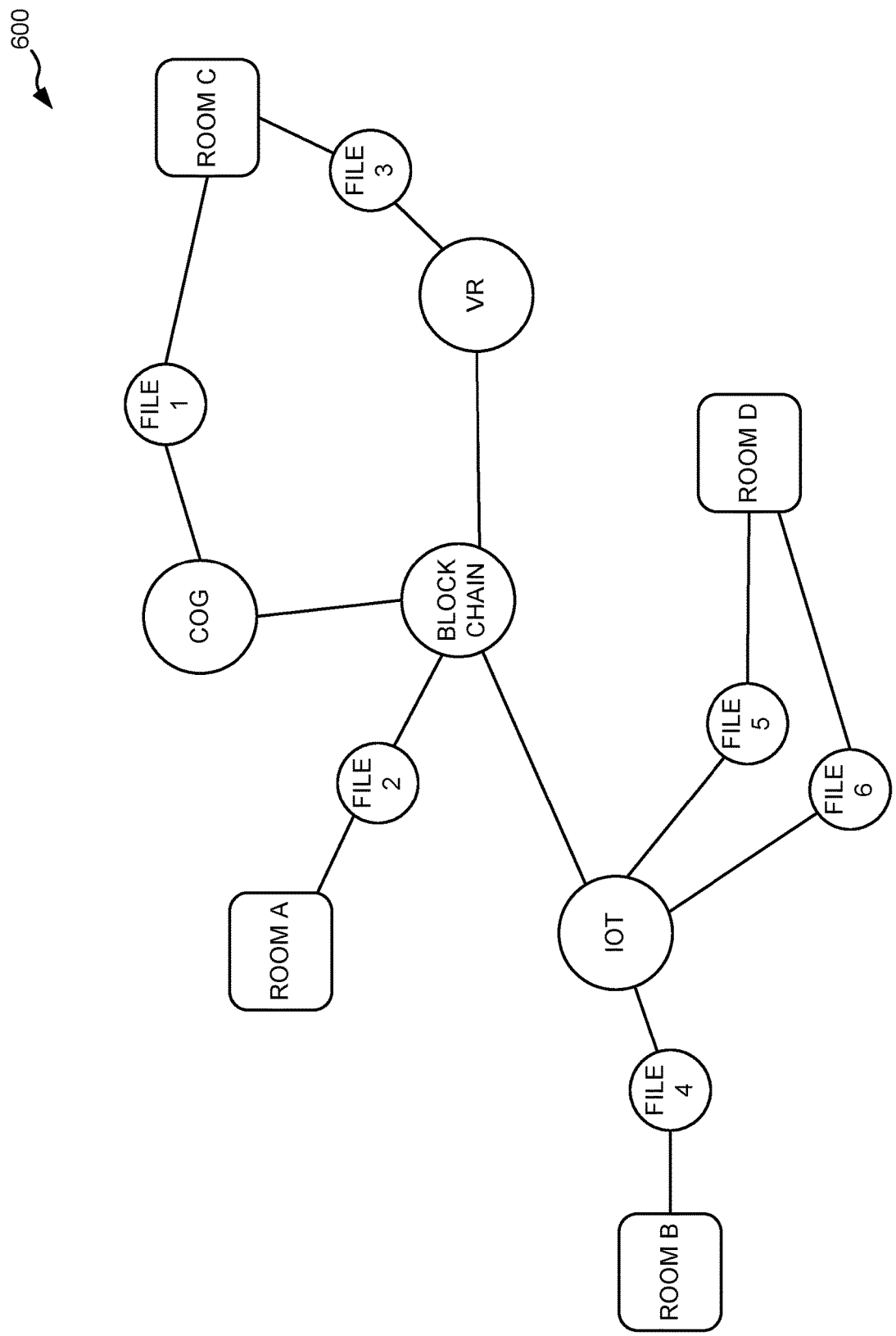
FIG. 6 depicts a block diagram of an example custom knowledge graph generated according to a query intended to retrieve a file from an information system based on knowledge of a location and a subject associated with the file, according to various embodiments.

FIG. 6 depicts a block diagram of an example custom knowledge graph 600 generated according to a query intended to retrieve a file from an information system based on knowledge of a location and a subject associated with the file, according to various embodiments. The knowledge graph 600 can be a custom knowledge graph generated from the natural language user query, "show me the files that are related to Block Chain that were discussed in Room D". Based on the natural language query, the information system can determine that the intention of the query is "file search". The information system can further determine that the set of factors included in the query are "topic" and "location". A knowledge display template for generating a "TOPIC-LOCATION" knowledge graph can be selected based on this intent and the set of two factors. The result set returned in response the natural language query includes file 1, file 2, file 3, file 4, file 5, and file 6. Since no files match the query exactly, the result set returned is a set of files that most closely match the query. The information system can analyze the metadata associated with each file to determine the relationships between the files, the meeting rooms where the files were discussed or accessed, and the topics associated with the files. These relationships are displayed on the knowledge graph 600. Although metadata information related to "user" is available, it is not displayed in the knowledge graph due to the selected knowledge display template. Since there are no files that directly satisfy the natural language query, the information system can generate questions, based on the selected knowledge display template, to refine the natural language query to reduce the result set. The information system can, for example, ask the user: are you sure the file was discussed in room D, or is the file related to Internet of Things (IoT)? The information system can select the questions based on their likelihood of reducing the result set.

FIG. 7 depicts a block diagram of a computing system for implementing a set of operations for retrieving information from an information system using knowledge graphs and incremental reasoning, according to various embodiments.

The components of the computing device 700 can include one or more processors 706, a memory 712, a terminal interface 718, a storage interface 720, an Input/Output ("I/O") device interface 722, and a network interface 724, all of which are communicatively coupled, directly or indirectly, for inter-component communication via a memory bus 710, an I/O bus 716, bus interface unit ("IF") 708, and an I/O bus interface unit 714.

The computing device 700 can include one or more general-purpose programmable central processing units (CPUs) 706A and 706B, herein generically referred to as the processor 706. In an embodiment, the computing device 700 can contain multiple processors; however, in another embodiment, the computing device 700 can alternatively be a single CPU device. Each processor 706 executes instructions stored in the memory 712.

The computing device 700 can include a bus interface unit 708 to handle communications among the processor 706, the memory 712, the display system 704, and the I/O bus interface unit 714. The I/O bus interface unit 714 can be coupled with the I/O bus 716 for transferring data to and from the various I/O units. The I/O bus interface unit 714 can communicate with multiple I/O interface units 718, 720, 722, and 724, which are also known as I/O processors (IOPs) or I/O adapters (IOAs), through the I/O bus 716. The display system 704 can include a display controller, a display memory, or both. The display controller can provide video, audio, or both types of data to a display device 702. The display memory can be a dedicated memory for buffering video data. The display system 704 can be coupled with a display device 702, such as a standalone display screen, computer monitor, television, a tablet or handheld device display, or another other displayable device. In an embodiment, the display device 102 can include one or more speakers for rendering audio. Alternatively, one or more speakers for rendering audio can be coupled with an I/O interface unit. In alternate embodiments, one or more functions provided by the display system 704 can be on board an integrated circuit that also includes the processor 706. In addition, one or more of the functions provided by the bus interface unit 708 can be on board an integrated circuit that also includes the processor 706.

The I/O interface units support communication with a variety of storage and I/O devices. For example, the terminal interface unit 718 supports the attachment of one or more user I/O devices, which can include user output devices (such as a video display devices, speaker, and/or television set) and user input devices (such as a keyboard, mouse, keypad, touchpad, trackball, buttons, light pen, or other pointing devices). A user can manipulate the user input devices using a user interface, in order to provide input data and commands to the user I/O device 726 and the computing device 700, can receive output data via the user output devices. For example, a user interface can be presented via the user I/O device 726, such as displayed on a display device, played via a speaker, or printed via a printer.

The storage interface 720 supports the attachment of one or more disk drives or direct access storage devices 728 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 728 can be implemented via any type of secondary storage device. The contents of the memory 712, or any portion thereof, can be stored to and retrieved from the storage device 728 as needed. The I/O device interface 722 provides an interface to any of various other I/O devices or devices of other types, such as printers or fax machines. The network interface 724 provides one or more communication paths from the computing device 700 to other digital devices and computer systems.

Although the computing device 700 shown in FIG. 7 illustrates a particular bus structure providing a direct communication path among the processors 706, the memory 712, the bus interface 708, the display system 704, and the I/O bus interface unit 714, in alternative embodiments the computing device 700 can include different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface unit 714 and the I/O bus 708 are shown as single respective units, the computing device 700, can include multiple I/O bus interface units 714 and/or multiple I/O buses 716. While multiple I/O interface units are shown, which separate the I/O bus 716 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 can be implemented as a desktop computer, portable computer, laptop or notebook computer, tablet computer, pocket computer, telephone, smart phone, or any other suitable type of electronic device.

In an embodiment, the memory 712 can include a random-access semiconductor memory, storage device, or storage medium (either volatile or nonvolatile) for storing or encoding data and programs. In another embodiment, the memory 712 represents the entire virtual memory of the computing device 700, and can also include the virtual memory of other computer systems coupled to the computing device 700 or connected via a network 730. The memory 712 can be a single monolithic entity, but in other embodiments the memory 712 can include a hierarchy of caches and other memory devices. For example, memory can exist in multiple levels of caches, and these caches can be further divided by function, so that one cache holds instructions while another holds non-instruction data, which is used by the processor. Memory 712 can be further distributed and associated with different CPUs or sets of CPUs, as is known in any various so-called non-uniform memory access (NUMA) computer architectures.

The memory 712 can store all or a portion of the components and data shown in FIGS. 1-6. In particular, the memory 712 can include components of interaction layer 712A, reasoning layer 712B, and content layer 712C. The components of interaction layer 712A, reasoning layer 712B, and content layer 712C can correspond, respectively, to components of interaction layer 210, reasoning layer 215, and content layer 220, as shown in FIG. 2. The computer executable code can be executed by processor 706. Some or all of the components and data shown in FIGS. 1-6 can be on different computer systems and can be accessed remotely, e.g., via a network 730. The computing device 700 can use virtual addressing mechanisms that allow the programs of the computing device 700 to behave as if they only have access to a large, single storage entity instead of access to multiple, smaller storage entities. Thus, while the components and data shown in FIGS. 1-6 are illustrated as being included within the memory 712, these components and data are not necessarily all completely contained in the same storage device at the same time. Although the components and data shown in FIGS. 1-6 are illustrated as being separate entities, in other embodiments some of them, portions of some of them, or all of them can be packaged together.

In an embodiment, the components and data shown in FIGS. 1-6 can include instructions or statements that execute on the processor 706 or instructions or statements that are interpreted by instructions or statements that execute the processor 706 to carry out the functions as further described below. In another embodiment, the components shown in FIGS. 1-6 can be implemented in hardware via semiconductor devices, chips, logical gates, circuits, circuit cards, and/or other physical hardware devices in lieu of, or in addition to, a processor-based system. In an embodiment, the components shown in FIGS. 1-6 can include data in addition to instructions or statements.

FIG. 7 is intended to depict representative components of the computing device 700. Individual components, however, can have greater complexity than represented in FIG. 7. In FIG. 7, components other than or in addition to those shown can be present, and the number, type, and configuration of such components can vary. Several particular examples of additional complexity or additional variations are disclosed herein; these are by way of example only and are not necessarily the only such variations. The various program components described as being included in FIG. 7 can be implemented, in various embodiments, in a number of different ways, including using various computer applications, routines, components, programs, objects, modules, data structures etc., which can be referred to herein as "software," "computer programs," or simply "programs."

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
  receiving a natural language query at an information system, the natural language query indicating an intent and at least a first factor and a second factor;
  retrieving a set of candidate information from the information system based on the natural language query, the set of candidate information having a type determined by the intent;
  selecting a knowledge display template from a set of knowledge display templates using the intent, the first factor and the second factor, wherein the selecting comprises:
    receiving a set of training sentences to train a classification model, wherein:
      the training sentences comprise training data for a machine learning model; and
      the training sentences indicate different ways of querying the information system;
    generating the classification model using the training sentences; and
    using the classification model to select the knowledge display template from the set of knowledge display templates based on the intent, the first factor and the second factor;
  rendering, using the knowledge display template, a display of a first knowledge graph comprising the set of candidate information, the first knowledge graph having a plurality of nodes and edges indicating relationships between a number of elements, represented by the plurality of nodes, of the set of candidate information based on the first factor and the second factor;
  determining that the set of candidate information is reducible; and
  generating, in response to the determination, and based on the relationship, a question associated with the first factor and the second factor to reduce the number of elements in the set of candidate information.

2. The method of claim 1, further comprising:
  reducing the number of the elements in the set of candidate information based on a response to the question to generate a reduced set of candidate information; and
  rendering, using the knowledge display template, a second knowledge graph comprising the reduced set of candidate information, the second knowledge graph indicating a relationship between the reduced number of the elements in the reduced set of candidate information based the first factor and the second factor.

3. The method of claim 2, further comprising:
  providing the reduced set of candidate information to satisfy the natural language query.

4. The method of claim 1, wherein the first factor and the second factor are named entities in the first knowledge graph.

5. The method of claim 1, further comprising determining the intent, the first factor and the second factor using a natural language classifier and set of natural language processing algorithms.

6. A system comprising:
  one or more computing nodes having a memory and a processor; and
  a computer readable storage medium of the one or more computing nodes having program instructions embodied therewith, the program instructions executable by the processor to cause the system to:
    receive a natural language query at an information system, the natural language query indicating an intent and at least a first factor and a second factor;
    retrieve a set of candidate information from the information system based on the natural language query, the set of candidate information having a type determined by the intent;
    select a knowledge display template from a set of knowledge display templates using the intent, the first factor and the second factor, wherein the selecting comprises:
      receiving a set of training sentences to train a classification model, wherein:
        the training sentences comprise training data for a machine learning model; and
        training sentences indicate different ways of querying the information system;
      generating the classification model using the training sentences; and using the classification model to select the knowledge display template from the set of knowledge display templates based on the intent, the first factor and the second factor;

render, using the knowledge display template, a display of a first knowledge graph comprising the set of candidate information, the first knowledge graph having a plurality of nodes and edges indicating relationships between a number of elements, represented by the plurality of nodes, of the set of candidate information based on the first factor and the second factor;

determining that the set of candidate information is reducible; and generating, in response to the determination, and based on the relationship, a question associated with the first factor and the second factor to reduce the number of elements in the set of candidate information.

7. The system of claim 6, wherein the program instructions are further executable by the processor to cause the system to:

reduce the number of elements in the set of candidate information based on a response to the question to generate a reduced set of candidate information; and render, using the knowledge display template, a second knowledge graph comprising the reduced set of candidate information, the second knowledge graph indicating a relationship between the reduced set of candidate information based the first factor and the second factor.

8. The system of claim 7, wherein the program instructions are further executable by the processor to cause the system to:

providing the reduced set of candidate information to satisfy the natural language query.

9. The system of claim 6, wherein the first factor and the second factor are named entities in the first knowledge graph.

10. The system of claim 6, wherein the program instructions are further executable by the processor to cause the system to determine the intent, the first factor and the second factor using a natural language classifier and set of natural language processing algorithms.

11. A computer program product, the computer program product including a computer readable storage medium having program instructions embodied therewith, wherein the computer readable storage medium is not a transitory signal per se, the program instructions executable by a processing circuit to cause the processing circuit to perform a method comprising:

receiving a natural language query at an information system, the natural language query indicating an intent and at least a first factor and a second factor;

retrieving a set of candidate information from the information system based on the natural language query, the set of candidate information having a type determined by the intent;

selecting a knowledge display template from a set of knowledge display templates using the intent, the first factor and the second factor, wherein the selecting comprises:

receiving a set of training sentences to train a classification model, wherein:

the training sentences comprise training data for a machine learning model; and the training sentences indicate different ways of querying the information system;

generating the classification model using the training sentences; and using the classification model to select the knowledge display template from the set of knowledge display templates based on the intent, the first factor and the second factor; and rendering, using the knowledge display template, a display of a first knowledge graph comprising the set of candidate information, the first knowledge graph having a plurality of nodes and edges indicating relationships between a number of elements, represented by the plurality of nodes, of the set of candidate information based on the first factor and the second factor;

determining that the set of candidate information is reducible; and generating, in response to the determination, and based on the relationship, a question associated with the first factor and the second factor to reduce the number of the elements in the set of candidate information.

12. The computer program product of claim 11, wherein the method further comprises:

reducing the number of elements in the set of candidate information based on a response to the question to generate a reduced set of candidate information; and rendering, using the knowledge display template, a second knowledge graph comprising the reduced set of candidate information, the second knowledge graph indicating a relationship between the reduced set of candidate information based the first factor and the second factor.

13. The computer program product of claim 12, the method further comprising:

providing the reduced set of candidate information to satisfy the natural language query.

14. The computer program product of claim 11, wherein the first factor and the second factor are named entities in the first knowledge graph.

15. The computer program product of claim 11, further comprising determining the intent, the first factor and the second factor using a natural language classifier and set of natural language processing algorithms.

\* \* \* \* \*